United States Patent
Kwon

(10) Patent No.: US 9,061,705 B2
(45) Date of Patent: Jun. 23, 2015

(54) PARKING ASSISTANCE SYSTEM USING PROJECTOR AND METHOD THEREOF INCLUDING ILLUMINATING THE PROJECTION AREA

(75) Inventor: Yang Woo Kwon, Yongin-si (KR)

(73) Assignee: Hyundai Mobis Co., Ltd., Yongin-si (KR)

( * ) Notice: Subject to any disclaimer, the term of this patent is extended or adjusted under 35 U.S.C. 154(b) by 399 days.

(21) Appl. No.: 13/546,350

(22) Filed: Jul. 11, 2012

(65) Prior Publication Data

US 2013/0120572 A1    May 16, 2013

(30) Foreign Application Priority Data

Nov. 14, 2011    (KR) .................. 10-2011-0118160

(51) Int. Cl.
- G08B 21/00 (2006.01)
- B62D 15/02 (2006.01)

(52) U.S. Cl.
CPC ................... B62D 15/0295 (2013.01)

(58) Field of Classification Search
USPC ............. 340/425.5, 932.2; 348/113; 382/104; 701/523
See application file for complete search history.

(56) References Cited

U.S. PATENT DOCUMENTS

| | | | |
|---|---|---|---|
| 2006/0250516 A1 | 11/2006 | Nishiuchi | |
| 2006/0287825 A1* | 12/2006 | Shimizu et al. | 701/216 |
| 2008/0129544 A1* | 6/2008 | Augst | 340/932.2 |

FOREIGN PATENT DOCUMENTS

| | | |
|---|---|---|
| DE | 10 2005 051 049 A1 | 5/2006 |
| DE | 10 2006 050 550 A1 | 4/2008 |
| EP | 1 065 642 A2 | 1/2001 |
| JP | 2000-272417 A | 10/2000 |
| JP | 2001-114015 A | 4/2001 |
| KR | 10-2005-0043536 A | 5/2005 |
| KR | 10-2006-0088988 A | 8/2006 |
| KR | 10-2010-0129965 A | 12/2010 |
| KR | 10-2011-0056593 A | 5/2011 |

* cited by examiner

Primary Examiner — Jeffery Hofsass
(74) Attorney, Agent, or Firm — NSIP Law

(57) ABSTRACT

A parking assistance system using a projector and a method thereof are provided. The parking assistance system includes a projector, a capture module, and a control unit. The projector projects an image to outside a vehicle. The capture module captures a projection region of the projector. The control unit controls the projector to illuminate the projection region, and controls a screen output of an image captured by the capture module.

16 Claims, 4 Drawing Sheets

PARKING ASSISTANCE SYSTEM USING PROJECTOR AND METHOD THEREOF INCLUDING ILLUMINATING THE PROJECTION AREA

CROSS-REFERENCE TO RELATED APPLICATIONS

This application claims priority under 35 U.S.C. §119 to Korean Patent Application No. 10-2011-0118160, filed on Nov. 14, 2011, the disclosure of which is incorporated herein by reference in its entirety.

TECHNICAL FIELD

The present disclosure relates to a vehicle parking system, and in particular, to a system for assisting the parking of a vehicle.

BACKGROUND

Generally, a parking assistance system of a vehicle overlaps a guide line image for reverse parking with a rearward image of the vehicle that has been captured by a rear camera, and displays the rearward image with the guide line image overlapped therewith, thereby providing a driver's convenience in reverse parking. As an example of such a technology, Korea Patent Publication No. 10-2011-0056593 has been disclosed a parking guide system. The parking guide system includes a steering angle measurement module, an image capture module, an image processing module, and a display module. The steering angle measurement module measures the steering angle information of a handle, and the image capture module captures a rearward region of a vehicle. The image processing module generates an overlap image by overlapping an image, captured by the image capture module, with a steering linkage trace line based on steering angle information that has been measured by the steering angle measurement module. The display module displays the image generated by the image processing module. As described above, a related art parking guide system displays a steering linkage trace line that is based on the rotation of a handle in reverse parking, and thus assists the reverse parking that is performed by a driver. However, when a parking space is very dark, it is difficult to visually check the parking space even though an image captured by a rear camera of a vehicle is displayed. In this case, the related art parking guide system cannot properly assist reverse parking that is performed by a driver.

SUMMARY

Accordingly, the present disclosure provides a system and a method, which can properly assist parking performed by a driver even when a parking space is dark.

The present disclosure also provides a system and a method, which can provide a pedestrian with information regarding the parking of a vehicle.

In one general aspect, a parking assistance system using a projector includes: a projector projecting an image to outside a vehicle; a capture module capturing a projection region of the projector; and a control unit controlling the projector to illuminate the projection region, and controlling a screen output of an image captured by the capture module.

The control unit may transfer a guide image for guiding parking of the vehicle to the projector, for the guide image to be projected onto the illuminated projection region.

The parking assistance system may further include a steering angle sensor detecting a steering angle, wherein the control unit transfers the guide image, having a guide line trace corresponding to the detected steering angle, to the projector.

The parking assistance system may further include an obstacle sensing module sensing an obstacle located in the projection region, wherein when the obstacle is sensed, the control unit transfers an obstacle image to the projector for the obstacle image to be projected onto the projection region.

The control unit may transfer a text image to the projector for the text image to be projected onto the projection region.

The text image may be an image for cautioning a pedestrian against the vehicle.

When intensity of illumination outside the vehicle is less than or equal to a reference value, the control unit may control the projector to illuminate the projection region.

The projector may project an image onto a rearward region of the vehicle.

When a gear shift lever is disposed at a backing step, the control unit may control the projector to illuminate the projection region.

When a gear shift lever is disposed at a backing step and intensity of illumination outside the vehicle is less than or equal to a reference value, the control unit may control the projector to illuminate the projection region.

In another general aspect, a parking assistance method using a projector includes: controlling the projector to illuminate a projection region outside a vehicle; and receiving an outward image of the vehicle, including the projection region illuminated by the projector, from a capture module to control a screen output of the image.

The parking assistance method may further include transferring a guide image for guiding parking of the vehicle to the projector, for the guide image to be projected onto the illuminated projection region.

The guide image may be an image which has a guide line trace corresponding to a steering angle.

The parking assistance method may further include: determining whether an obstacle is located in the illuminated projection region; and transferring an obstacle image to the projector for the obstacle image to be projected onto the illuminated projection region, when the obstacle is determined as being located.

The parking assistance method may further include transferring a text image to the projector for the text image to be projected onto the illuminated projection region.

The text image may be an image for cautioning a pedestrian against the vehicle.

The parking assistance method may further include determining whether sensed intensity of illumination outside the vehicle is less than or equal to a reference value, wherein when the sensed intensity of illumination is less than or equal to the reference value, the controlling of the projector is performed.

The projection region may be a certain region rearward from the vehicle.

The parking assistance method may further include determining whether a gear shift lever is disposed at a backing step, wherein when the gear shift lever is disposed at the backing step, the controlling of the projector is performed.

The parking assistance method may further include determining whether sensed intensity of illumination outside the vehicle is less than or equal to a reference value, wherein when the gear shift lever is disposed at the backing step and the sensed intensity of illumination is less than or equal to the reference value, the controlling of the projector is performed.

Other features and aspects will be apparent from the following detailed description, the drawings, and the claims.

DETAILED DESCRIPTION OF EMBODIMENTS

Figure 1:
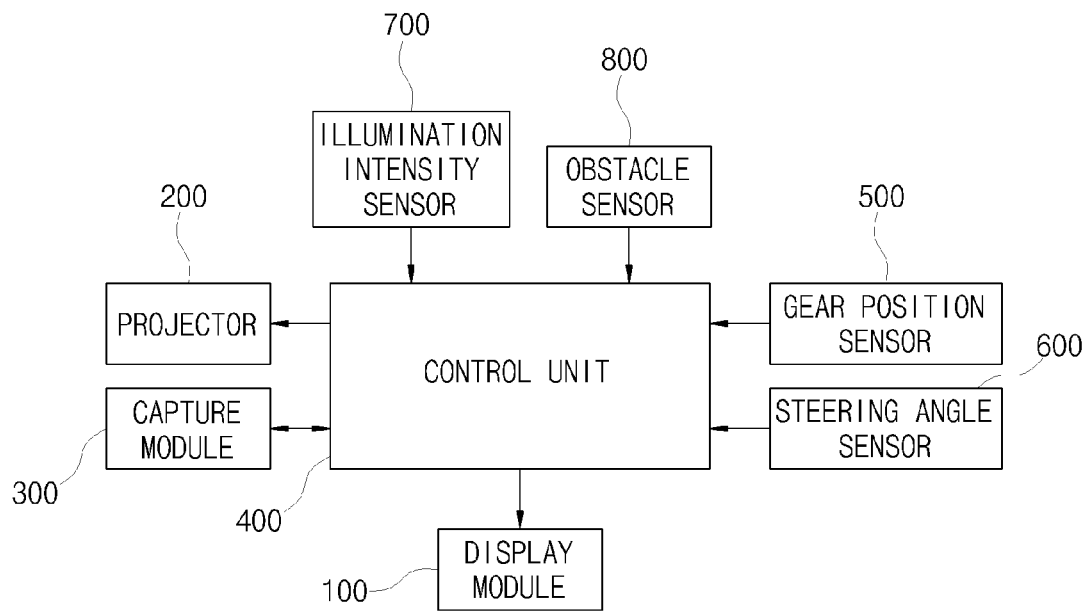
FIG. 1 is a block diagram illustrating a parking assistance system using a projector, according to an embodiment of the present disclosure.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is a block diagram illustrating a parking assistance system using a projector, according to an embodiment of the present disclosure.

Figure 2:
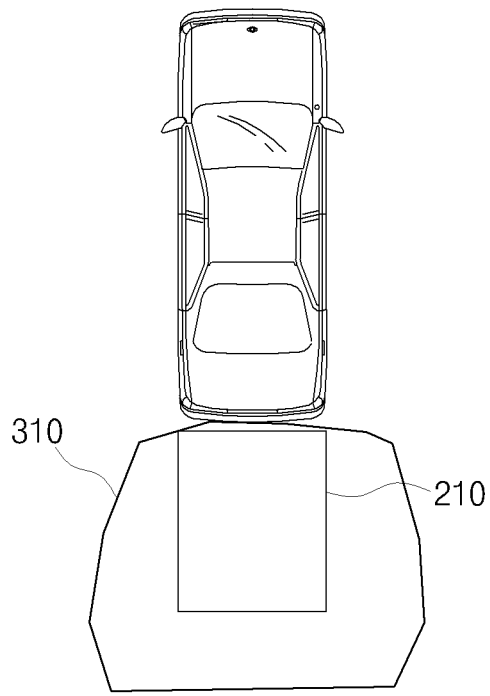
FIG. 2 is an exemplary diagram illustrating a rearward view region of a vehicle according to an embodiment of the present disclosure.

Referring to FIG. 1, a parking assistance system according to an embodiment of the present disclosure includes a display module 100, a projector 200, a capture module 300, and a control unit 400. Furthermore, the parking assistance system may further include a gear position sensor 500. Also, the parking assistance system may further include a steering angle sensor 600 and an illumination intensity sensor 700. The display module 100 may be a Liquid Crystal Display (LCD), and display image data, delivered from the control unit 400, on a screen. The projector 200 is a device that projects an image on a projection screen, and may be mounted on an appropriate position of a vehicle so as to project the image onto the outside of the vehicle. In an embodiment, the projector 200 projects an image onto a rearward region of the vehicle. A projection region may be a road surface rearward from the vehicle, a wall surface rearward from the vehicle, or the like. The capture module 300 is a camera, and is mounted on an appropriate position of the vehicle so as to capture the projection region of the projector 200. As illustrated in FIG. 2, the projector 200 and the capture module 300 are respectively mounted on the appropriate positions of a rear end of the vehicle such that a projection region 210 of the projector 200 is disposed inside a capture view region 310 of the capture module 300. The control unit 400 may be an electronic control unit that controls electronic devices of the vehicle. The control unit 400 may transmit/receive a signal to/from the projector 200 and the capture module 300 through a Serial Peripheral Interconnector (SPI), an Inter-Integrated Circuit (I2C), or a Universal Asynchronous Receiver/Transmitter (UART). Alternatively, the control unit 400 may transmit/receive a signal over a vehicle communication network such as a Controller Area Network (CAN). Also, the control unit 400 may be connected to the display module 100 through a bus interface or a vehicle network such as the CAN.

The gear position sensor 500 senses which gear step a gear shift lever is disposed at. That is, the gear position sensor 500 sense which of a parking step (P), reverse step (R), neutral step (N), and driving step (D) the gear shift lever is disposed at, and may be configured with a plurality of gear-step switches which are switched on according to that the gear shift lever is disposed at a corresponding gear step. The steering angle sensor 600 is a known sensor that detects a steering angle. The illumination intensity sensor 700 is a module that senses intensity of illumination outside the vehicle, and may be an auto light sensor that is generally mounted on vehicles. The illumination intensity sensor 700 is mounted on an appropriate position of a rear end of the vehicle so as to sense intensity of illumination in the rearward region of the vehicle. The control unit 400 may respectively receive gear position information, steering angle information, and illumination intensity information from the gear position sensor 500, the steering angle sensor 600, and the illumination intensity sensor 700 over the vehicle communication network such as the CAN or a Local Interconnect Network (LIN).

Hereinafter, an embodiment of a parking assistance process of the parking assistance system will be described with reference to FIG. 1. In the following description, for convenience of description, the parking assistance system is limited as performing a process for assisting reverse parking, but the present disclosure is not limited thereto.

Figure 3:
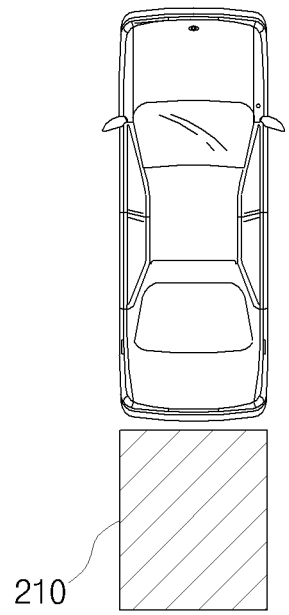
FIG. 3 is an exemplary diagram illustrating a projection region where a projector according to an embodiment of the present disclosure illuminates a road surface rearward from a vehicle.

First, the control unit 400 controls the projector 200 to illuminate the rearward region of the vehicle, and controls the capture module 300 to capture the rearward region of the vehicle. In an embodiment, when the gear position sensor 500 senses the gear shift lever being disposed at the backing step, the control unit 400 controls the projector 200 and the capture module 300. Specifically, the control unit 400 transfers a control signal for activating a projection lamp function, to the projector 200, and transfers a control signal indicating a capture to the capture module 300. Therefore, the projector 200 operates a projection lamp to illuminate a road surface rearward from the vehicle, and the capture module 300 starts a capture. Herein, an illumination region, namely, the projection region 210 of the projector 200 may be matched with the width of the vehicle as illustrated in FIG. 3. The capture module 300 converts a light signal, inputted through a lens, into an electric image signal and then converts the electric image signal into digital image data to transfer the digital image data to the control unit 400. The control unit 400 outputs the digital image data to the display module 100, which displays a rearward image of the vehicle on a screen. In this way, the rearward image of the vehicle illuminated by the projector 200 is displayed, and thus, a driver easily checks the rearward region of the vehicle visually, thereby performing stable reverse parking.

Figure 4:
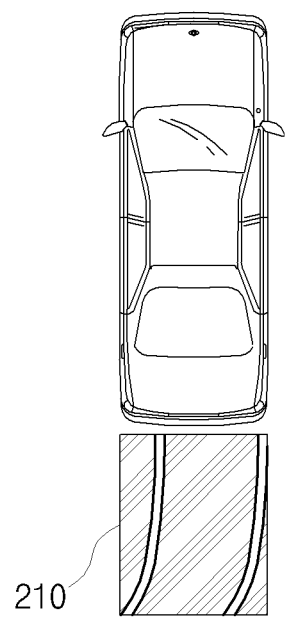
FIG. 4 is an exemplary diagram illustrating a backing guide image which is projected onto the road surface rearward from the vehicle according to an embodiment of the present disclosure.

Additionally, the control unit 400 delivers a reverse parking assistance image to the projector 200, thereby allowing the projector 200 to project the reverse parking assistance image onto the projection region 210. The reverse parking assistance image may be a backing guide image, an obstacle image, or a text image. Alternatively, the reverse parking assistance image may be an image with two or more overlapped images. In a first embodiment, the control unit 400 delivers the backing guide image to the projector 200 and thus allows the backing guide image to be projected onto the projection region 210. Herein, the backing guide image is an image for guiding the backing of the vehicle. In an embodiment, the backing guide image is an image where both guide lines are separated by the width of the vehicle and displayed as a straight line. In another embodiment, the backing guide image is an image where a guide line trace corresponding to a steering angle is displayed on a background image. In the latter, a memory of the parking assistance system may correspondingly store guide line trace images by steering angle. In this case, the control unit 400 receives steering angle information from the steering angle sensor 600, and extracts a guide line trace image, corresponding to the received steering angle information, from the memory. The control unit 400 displays the extracted guide line trace image on the background image, and transfers the background image with the guide line trace image displayed thereon, to the projector 200. Therefore, as illustrated in FIG. 4, the projector 200 projects the guide line trace image onto the projection region 210.

Figure 5:
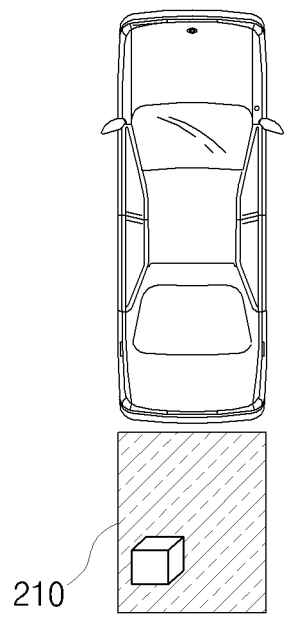
FIG. 5 is an exemplary diagram illustrating an obstacle image which is projected onto the road surface rearward from the vehicle according to an embodiment of the present disclosure.

In a second embodiment, the control unit 400 transfers the obstacle image to the projector 200, thereby allowing the obstacle image to be projected onto the projection region 210. For this end, the parking assistance system may further include an obstacle sensor 800 that senses whether an obstacle is located in the rearward region of the vehicle. As the obstacle sensor 800, an ultrasonic sensor may be used. A plurality of the ultrasonic sensors may be disposed at certain intervals, at the rear end of the vehicle. Therefore, the location of the obstacle is detected by the ultrasonic sensor. That is, when a left ultrasonic sensor has sensed an obstacle, the control unit 400 determines the obstacle as being disposed at the left of the rearward region of the vehicle, but when a right ultrasonic sensor has been sensed an obstacle, the control unit 400 determines the obstacle as being disposed at the right of the rearward region of the vehicle. Also, the control unit 400 may determine a distance from the vehicle to the obstacle, with ultrasonic sensing data. Therefore, in consideration of the location of the obstacle and a distance to the obstacle, the control unit 400 displays an obstacle image object on the background image to generate an obstacle image, and transfers the obstacle image to the projector 200. Thus, as illustrated in FIG. 5, the projector 200 projects the obstacle image onto the projection region 210. Accordingly, even at an environment where the rearward region of the vehicle is dark, the driver can find the obstacle that is located at the left of the rearward region of the vehicle, by using the display module 100.

Figure 6:
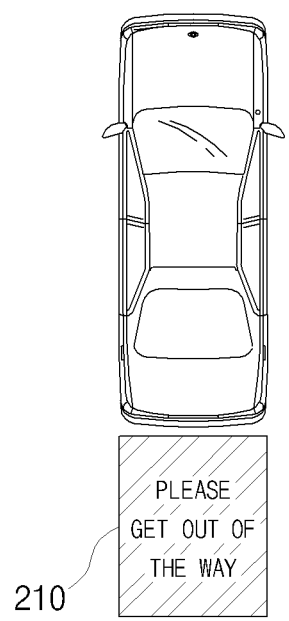
FIG. 6 is an exemplary diagram illustrating a text image which is projected onto the road surface rearward from the vehicle according to an embodiment of the present disclosure.

In a third embodiment, the control unit 400 delivers the text image to the projector 200, thereby allowing the text image to be projected onto the projection region 210. Herein, the text image is an image where a text is displayed on the background image. The text is a caution phrase for notifying a pedestrian of that the vehicle intends to back. The caution phrase may be selected by the driver. That is, the driver may select any one of a plurality of caution phrases, which are stored in the memory of the parking assistance system, through a user interface and use the selected phrase in reverse parking. Alternatively, the driver may input a desired caution phrase through the user interface and use the inputted phrase. The control unit 400 displays a default caution phrase on the background image to generate the text image, and transfers the text image to the projector 200. Therefore, as illustrated in FIG. 6, the projector 200 projects the text image onto the projection region 210. Accordingly, the stability of the pedestrian can be secured, and moreover, the text image can aid the backing or reverse parking of the vehicle.

In the above-described embodiments, the control unit 400 transfers the guide image, the obstacle image, or the text image to the projector 200, but the present disclosure is not limited thereto. The control unit 400 may transfer an image with two or more overlapped images to the projector 200, and moreover, depending on the case, the control unit 400 may transfer a corresponding image to the projector 200. As an example, the control unit 200 may initially transfer the text image to the projector 200 for one sec to two sec, and then transfer the guide image, the obstacle image, or a guide image with an obstacle image object overlapped therewith to the projector 200. As another example, when the gear shift lever is disposed at the backing step, the control unit 400 immediately transfer the guide image or the guide image with the obstacle image object overlapped therewith to the projector 200, but when the movement of an obstacle is sensed by the obstacle sensor 800, the control unit 400 may transfer the text image to the projector 200. Also, various information as well as the below-described reverse parking assistance image may be projected onto the projection region 210.

The control unit 400 may not determine whether to perform a reverse parking assistance process by using only position information of the gear shift lever but determine whether to perform the reverse parking assistance process on the further basis of illumination intensity information. That is, when the position of the gear shift lever sensed by the gear position sensor 500 is the backing step and intensity of illumination sensed by the illumination intensity sensor 700 is less than or equal to a reference value, the control unit 400 performs the reverse parking assistance process. Herein, the reference value denotes a value that becomes a reference for determining the rearward region of the vehicle as dark. This is because the projector 200 needs not perform an unnecessary operation when the rearward region of the vehicle is not dark and thus an image captured by the camera is well checked. As another example, with no consideration of the position of the gear shift lever, the control unit 400 may perform the reverse parking assistance process when the intensity of illumination sensed by the illumination intensity sensor 700 is less than or equal to the reference value.

Figure 7:
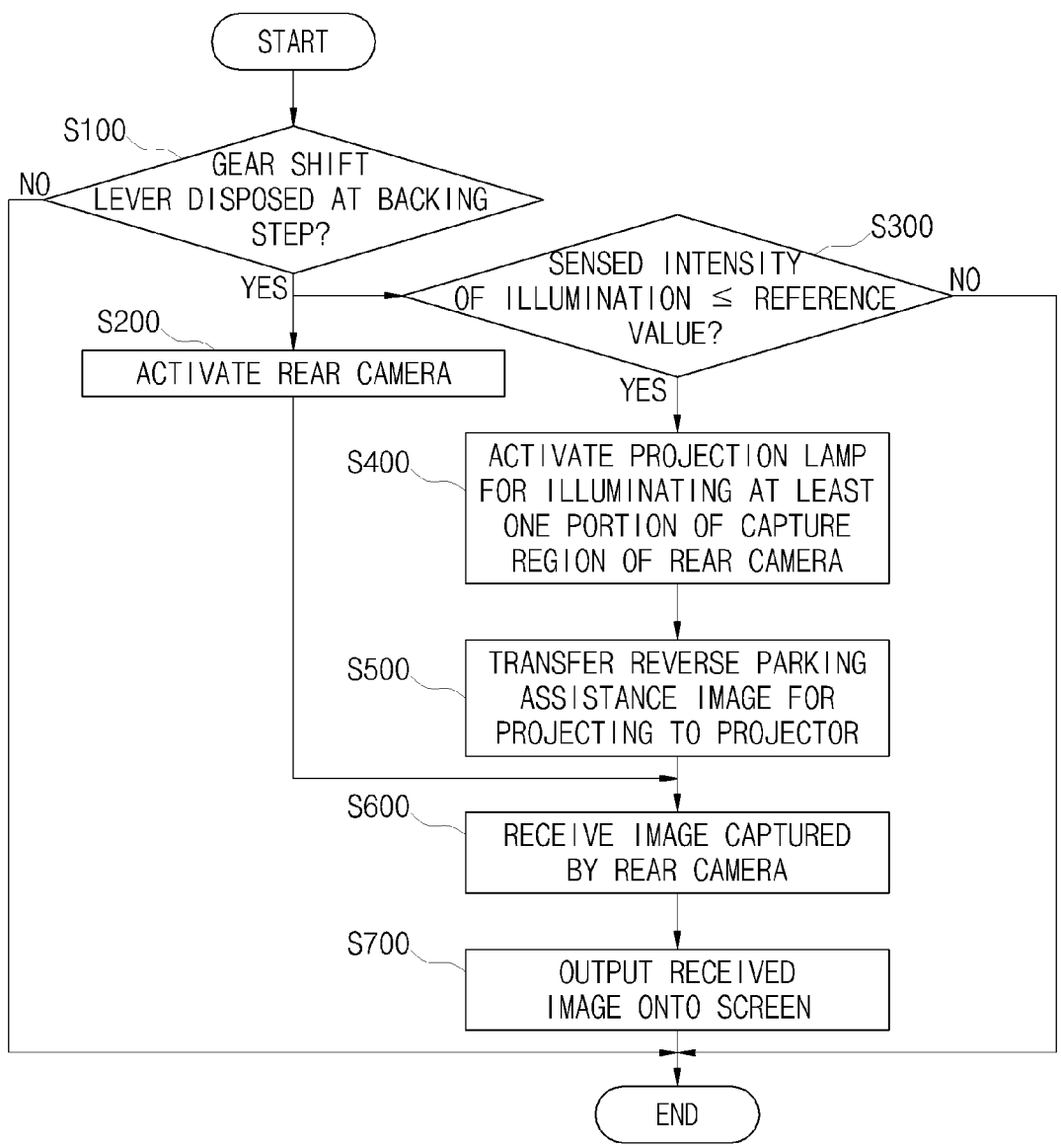
FIG. 7 is a flowchart illustrating a parking assistance method using the projector, according to an embodiment of the present disclosure.

FIG. 7 is a flowchart illustrating a parking assistance method using the projector, according to an embodiment of the present disclosure.

Referring to FIG. 7, the control unit 400 determines whether the gear shift lever is disposed at the backing step in operation S100. In an embodiment, the control unit 400 may determine whether the gear shift lever is disposed at the backing step, with a switching signal inputted from the gear position sensor 500. In operation S200, when the gear shift lever is determined as being disposed at the backing step, the control unit 400 activates the capture camera 300 that is a rear camera. Also, the control unit 400 determines whether the intensity of illumination sensed by the illumination intensity sensor 700 is less than or equal to the reference value in operation S300. In operation S400, when the sensed intensity of illumination is determined as less than or equal to the reference value, the control unit 400 controls the projector 200 to activate the projection lamp. The activated projection lamp illuminates a road surface (which is at least one portion of the capture region of the capture module 300) rearward from the vehicle. Such an illumination region is a projection region onto which an image is projected.

The control unit 400 activates the projection lamp, and then delivers a reverse parking assistance image, intended to be projected onto the projection region, to the projector 200 in operation S500. The projector 200 projects the reverse parking assistance image onto the projection region. Herein, the reverse parking assistance image may be the backing guide image of FIG. 4, the obstacle image of FIG. 5, the text image of FIG. 6, or an overlap image thereof. As an example, the overlap image may be the backing guide image with an obstacle image object overlapped therewith.

In an embodiment, the control unit 400 activates the projection lamp, delivers the text image to the projector 200 to be projected onto the projection region for one sec to two sec, and delivers the backing guide image to the projector 200 to be projected onto the projection region. Alternatively, the control unit 400 may activate the projection lamp, and immediately deliver the backing guide image to the projector 200 to be projected onto the projection region. At this point, when the change of a steering angle is not sensed by the steering angle sensor 600, the control unit 400 delivers a backing guide image with a fixed guide line displayed thereon to the projector 200, or when the change of a steering angle is sensed by the steering angle sensor 600, the control unit 400 delivers a backing guide image with a guide line trace (corresponding to the sensed steering angle) displayed thereon to the projector 200. When an obstacle is sensed by the obstacle sensor 800, the control unit 400 delivers a backing guide image with an obstacle image object overlapped therewith to the projector 200, thereby allowing the backing guide image to be projected onto the projection region. When the movement of an obstacle is sensed, the control unit 400 delivers a text image to the projector 200, thereby allowing the text image to be projected onto the projection region. In this case, a phrase (which requests the aid of a pedestrian) such as "please get out of the way!" may be displayed as a phrase that is displayed on the text image. Subsequently, when the movement of the obstacle is not sensed, the control unit 400 again transfers a backing guide image to the projector 200, thereby allowing the backing guide image to be projected onto the projection region.

The activated capture module 300 converts a light signal, inputted through a lens, into an electric signal, and converts the electric signal into digital image data to transfer the digital image data to the control unit 400. The control unit 400 receives the digital image data from the capture module 300 in operation S600, processes the digital image data according to a screen output format, and outputs the processed image data to the display module 100 in operation S700. Therefore, when the gear shift lever is disposed at the backing step and the sensed intensity of illumination is less than or equal to the reference value, the display module 100 displays an image, captured by the camera, for a region which is illuminated by the projector 200 and onto which the reverse parking assistance image is projected.

In FIG. 7, operation S400 of activating the projection lamp is illustrated as being performed after operation S200 of activating the capture module 300, but the present disclosure is not limited thereto. That is, the projection lamp may be first activated, and then the capture module 300 may be activated. For example, when the gear shift lever is checked as being disposed at the backing step, the control unit 400 determines whether the sensed intensity of illumination is less than or equal to the reference value. When the sensed intensity of illumination is less than or equal to the reference value, the control unit 400 may activate the projection lamp and then activate the capture module 300. Alternatively, the control unit 400 may activate the projection lamp, deliver an image for projecting to the projector 200, and then activate the capture module 300. That is, the sequential operations of FIG. 7 are illustrated as an example, and the order of performing the operations of FIG. 7 may be changed.

The above-described operation S300 may not be performed. That is, when the gear shift lever is disposed at the backing step, the control unit 400 may activate the capture module 300, and moreover activate the projection lamp irrespective of intensity of illumination. Also, the above-described operation S100 may not be performed. That is, when the sensed intensity of illumination is determined as less than or equal to the reference value, the control unit 400 may activate the projection lamp regardless of the position of the gear shift lever. In this case, the control unit 400 may further consider conditions other than the position of the gear shift lever. For example, in a state where a mode of assisting reverse parking has been set, the control unit 400 activates the capture module 300 and the projection lamp when the sensed intensity of illumination is less than or equal to the reference value. Also, the above-described operations S100 and S300 may not be performed. That is, when conditions other than the disposition of the gear shift lever and the intensity of illumination are achieved, the control unit 400 may activate the capture module 300 and the projection lamp. For example, when a driver inputs a command for assisting reverse parking through the user interface, the control unit 400 may activate the capture module 300 and the projection lamp.

According to the embodiments of the present disclosure, the projector illuminates the capture region of the camera at a dark environment where an image captured by the camera is invisible to a driver, thus enabling the driver to easily check the captured image visually. Furthermore, the projector projects various images (for example, the backing guide image, the obstacle image, or the text image that includes a phrase for cautioning a pedestrian against a vehicle) for the support of parking, onto the outside of the vehicle, and thus can more actively assist parking.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A parking assistance system using a projector, the system comprising:

a projector configured to project an image outside a vehicle;

a capture module configured to capture a projection region projected by the projector;

a control unit configured to control the projector to illuminate the projection region and control a screen output of an image captured by the capture module; and a steering angle sensor configured to detect a steering angle of the vehicle, wherein:

the control unit transfers a guide image, having a guide-line trace for guiding parking of the vehicle and corresponding to the detected steering angle, to the projector, and the projector projects the guide image onto the illuminated projection region.

2. The parking assistance system of claim 1, further comprising:

an obstacle sensing module sensing an obstacle located in the projection region, wherein:

when the obstacle is sensed, the control unit transfers an obstacle image to the projector, and the projector projects the obstacle image onto the projection region.

3. The parking assistance system of claim 1, wherein:

the control unit transfers a text image to the projector, and the projector projects the text image onto the projection region.

4. The parking assistance system of claim 3, wherein the text image is an image for cautioning a pedestrian about the vehicle.

5. The parking assistance system of claim 1, wherein when intensity of illumination outside the vehicle is less than or equal to a reference value, the control unit controls the projector to illuminate the projection region.

6. The parking assistance system of claim 1, wherein the projector projects the image captured by the capture module onto a rearward region of the vehicle.

7. The parking assistance system of claim 6, wherein when a gear shift lever of the vehicle is disposed in a reverse position for rearward movement of the vehicle, the control unit controls the projector to illuminate the projection region.

8. The parking assistance system of claim 6, wherein when a gear shift lever of the vehicle is disposed in a reverse position for rearward movement of the vehicle and intensity of illumination outside the vehicle is less than or equal to a reference value, the control unit controls the projector to illuminate the projection region.

9. A parking assistance method using a projector, the parking assistance method comprising:

controlling the projector to illuminate a projection region outside a vehicle; and receiving, from a capture module, an outward image from the vehicle comprising the projection region illuminated by the projector;

displaying the image on a screen;

detecting a steering angle of the vehicle;

transferring a guide image, having a guide-line trace for guiding parking of the vehicle and corresponding to the detected steering angle, to the projector; and projecting, with the projector, the guide image onto the illuminated projection region.

10. The parking assistance method of claim 9, further comprising:

determining whether an obstacle is located in the illuminated projection region;

transferring an obstacle image to the projector; and projecting the obstacle image onto the illuminated projection region, when the obstacle is determined as being located.

11. The parking assistance method of claim 9, further comprising:

transferring a text image to the projector; and projecting the text image onto the illuminated projection region.

12. The parking assistance method of claim 11, wherein the text image is an image for cautioning a pedestrian about the vehicle.

13. The parking assistance method of claim 9, further comprising:

determining whether sensed intensity of illumination outside the vehicle is less than or equal to a reference value, wherein when the sensed intensity of illumination is less than or equal to the reference value, the projector is controlled to illuminate the projection region outside the vehicle.

14. The parking assistance method of claim 9, wherein the projection region is a certain region rearward from the vehicle.

15. The parking assistance method of claim 14, further comprising:

determining whether a gear shift lever of the vehicle is disposed in a reverse position for rearward movement of the vehicle, wherein when the gear shift lever is disposed in the reverse position, the projector is controlled to illuminate the projection region outside the vehicle.

16. The parking assistance method of claim 15, further comprising:

determining whether sensed intensity of illumination outside the vehicle is less than or equal to a reference value, wherein when the gear shift lever is disposed in the reverse position and the sensed intensity of illumination is less than or equal to the reference value, the projector is controlled to illuminate the projection region outside the vehicle.

\* \* \* \* \*